United States Patent [19]
Kay

[11] 3,900,439
[45] Aug. 19, 1975

[54] METHOD AND COMPOSITION FOR REPAIRING ASPHALT PAVEMENT
[75] Inventor: Carl Joseph Kay, Burbank, Calif.
[73] Assignee: Products Research & Chemical Corporation, Burbank, Calif.
[22] Filed: May 24, 1974
[21] Appl. No.: 473,136

[52] U.S. Cl............................................. 260/28.5 AS
[51] Int. Cl. ............................................. C08f 45/52
[58] Field of Search ............................. 260/28.5 AS

[56] References Cited
UNITED STATES PATENTS
3,442,841  5/1969  Adelman..................... 260/28.5 AS
3,821,144  6/1974  Goyer et al.................. 260/28.5 AS Primary Examiner—M. J. Welsh
Attorney, Agent, or Firm—Miketta, Glenny, Poms & Smith

[57] ABSTRACT

A method and composition for filling voids in asphalt pavement, said method including forming a uniform admixture of (a) aggregate granules the surfaces of which are substantially completely coated with a binder consisting essentially of a mixture of asphalt and ethylene-vinylacetate copolymer and (b) less than 5 percent, by weight, of a solvent for the binder which will tackify and solvate said binder, and filling said voids with said admixture.

18 Claims, No Drawings

METHOD AND COMPOSITION FOR REPAIRING ASPHALT PAVEMENT

BACKGROUND OF THE INVENTION

Asphaltic-based pavements are, in general, mixtures of graded aggregate particles and asphalt, the mixture being applied at a relatively high temperatures and pressures to achieve compaction. The aggregates or rock bear the weight or loads applied to the pavement while the asphalt acts as a binder holding the aggregate and, in addition, maintaining the road bed against water intrusion and physical disruption.

As is known, asphalt pavements will deteriorate to varying degrees depending upon their construction, service and climatic conditions. This deterioration results, inter alia, in voids such as cracks and "pot holes" on the top surface of the asphalt pavement, said voids being dangerous to vechicular travel and, moreover, causing rapid disintegration of the roadway if left unrepaired. However, at present, such repair is difficult because the typical method of repairing and filling voids in asphalt pavement is to utilize a hot-mix asphalt. Such a method of repair is particularly difficult because, in general, the voids are normally relatively small and widely scattered. Moreover, such repair work often times must be carried out under adverse conditions such as rain, snow, and low temperatures. This makes it very difficult to repair roads because the sources of hot-mix asphalt used by most municipalities do not operate during the winter.

Even if it is possible to repair the voids in the surface of asphalt pavements utilizing hot-mix asphalt, this method is still not desirable because the repair fails in a relatively short period of time due to the fact that asphalt is brittle at low temperatures and is unable to mechanically take the stresses which are present in the voids and which caused the failure in the first place.

Inasmuch as it is clearly evident to workers in the art that the hot-mix asphalt method of repairing asphalt pavements, particularly under low temperatures conditions, is unsatisfactory it is not surprising that other approaches and methods for making pavement patches (i.e. filling the voids in asphalt pavement) have been attempted, particularly methods which will work satisfactorily in cold weather. Such methods include modification of asphalt by the addition of a toughening resin such as a polyethylene-polyvinylacetate copolymer. Inasmuch as the fluidity of this composition is not sufficiently high to be usable as a method of repairing asphalt pavements the addition of a fluxing oil in relatively large amounts was proposed to provide sufficient fluidity for compaction. However, even using large amounts of fluxing oil, it is still necessary to apply heat to the composition either per se or by heating the pavement.

Other attempts at solving the problem of repairing asphalt has resulted in utilizing asphalt emulsions mixed with aggregate. Still another method has employed aggregate dusted with a layer of gilsonite and compacted after application.

All of the above methods and compositions are unsatisfactory because they either produce patches which remain physically soft and unstable for long periods of time after application of one cannot properly compact the aggregate because the compositions are not sufficiently fluid.

As noted above, asphalt pavements depend on high aggregate loading for their stability as well as low cost. It therefore follows that any material which is utilized to repair voids or cracks in the asphalt pavement and which uses an essentially plastic binder requires a similar large amount of aggregate. Physically, however, such large amounts of aggregate are not readily usable unless the binder is fluid and the mass is compacted to maximum density. As also noted, the common method for providing fluidity, i.e. heating and melting, is not in general satisfactory for small repairs. If a totally solvated binder or matrix is used in lieu of heat to provide such fluidity, the amount of solvent required is so great and its rate of escape from the binder so slow that an unstable repair or patch results which is immediately removed and destroyed by traffic traveling over the asphalt pavement.

From the foregoing it is readily apparent that it is a desideratum in the art to discover a method and composition for simply, efficiently and easily repairing voids in asphalt pavements in all types of weather.

It is therefore the primary object of the present invention to disclose and provide such compositions and methods and, more particularly, to provide a patching composition of sufficient fluidity, without addition of heat, to repair asphalt pavement under adverse conditions but, at the same time, will form a tough rapid setting patch that immediately permits vehicular travel thereon without harm.

Other objects of the present invention will be apparent from the following embodiments wherein all parts and percentages are by weight unless otherwise stated.

DESCRIPTION OF THE PREFERRED EMBODIMENTS

The foregoing objects and others are accomplished by the present invention by providing a coating on aggregate used for asphalt pavements, said coated aggregate granules having the property of being able to be stored for a long period of time, even in hot summer weather, but when contacted with a small amount of solvent have sufficient fluidity to form a patch on asphalt pavement and, at the same time, dry rapidly so that vechicular traffic can be driven over the patch in a very short period of time without breaking or removing the patch.

The aggregate coated granules or particles are formed by coating the granules or particles with a uniform admixture of asphalt and ethylene-vinylacetate copolymer. The coated particles, as noted above, can be stored indefinitely, even in hot weather, without fusing together or deteriorating and therefore large amounts can be produced during ideal climatic conditions and stored throughout the winter months.

When it is necesarry to repair voids such as cracks, pot holes, and holes in asphalt paving and the like, the coated aggregate granules are mixed with a solvent for the asphalt and copolymer, said solvent being capable of tackifying and rapidly solvating the binder coating of the aggregate granules so that the coated aggregate granules have sufficient fluidity to fill the voids and also be compacted thereafter to form a rapid drying and long lasting patch.

After applying the solvent, which, surprisingly, performs a function similar to that of heat, the thus obtained mixture of solvent and coated aggregate particles must be used while the solvent is still available to act as a lubricant to provide fluidity and before it is absorbed completely by the binder coating on the aggregate granules. In general, such a mixture of solvent and coated aggregate granules should be utilized to repair and fill the voids in the asphalt pavement between three minutes and 48 hours, depending upon the ambient conditions, the particular solvent being utilized, and the amount of solvent. However, it is emphasized that the amount of solvent utilized is very little and always less that 5 percent by weight of the entire composition and, in general, between 0.5 or 1.0 to 3 or 4 percent.

In certain situations and under certain conditions, it is preferable if the solvent contain, in solution, a slight amount of asphalt, ethylene-vinylacetate resin, or a mixture of the two. Such solutions provide fusion almost immediately after mixing. Additionally, such solutions can be used as primers for bonding the fresh patching composition to the old asphalt pavement or road.

The particular type of aggregate useful in the present invention is well known in the art and therefore no detailed exemplification thereof will be given. In general, any type of rock, stone or mineral of suitable size can be utilized in the present invention. In general, the amount of aggregate, depending upon the nature and grading of the aggregate, will amount to as high as 95 or 97 percent to as little as 80, 85 or 88 percent, based on the total weight of the aggregate and coating.

The asphalt utilized in the present invention can be any conventional asphalt such as an asphalt of between 40–50 to 120–150 penetration grade. Similarly, the ethylene-vinylacetate copolymer is conventional can can be made by method well known in the art and may contain from 18 to 42 percent, by weight, of vinylacetate, and have a melt index ranging from about 15 to 200.

The amount of asphalt and ethylene-vinylacetate copolymer in the coating composition may vary widely; the amount of asphalt may be from 95 percent by weight to as low as 60 or 40 percent by weight with the amount of ethylene-vinylacetate resin ranging from 5 percent by weight to as high as 40 or 60 percent by weight based on the combined weight of the asphalt and ethylene-vinylacetate copolymer.

As noted above, the solvent solution may be utilized in amounts of from 0.5 percent to as high as 4 or 5 percent, by weight, and may comprise the solvent per se or a binder such as asphalt, ethylenevinylacetate copolymer or mixtures of the two. The solvent solution will, in general, contain relatively small amounts of binder (i.e. asphalt and/or ethylene-vinylacetate resin), for example, the amount thereof in the solvent may range from 0 to 50 percent, by weight, based on the total weight of the solvent solution. When a mixture of asphalt and ethylene-vinylacetate copolymer is used the mixture may contain, for example, from as little as 2 to as high as 50 percent, by weight of ethylene-vinylacetate resin as from 98 to 50 percent, by weight of asphalt.

The solvent or solvents used in this invention must be capable of dissolving or tackifying both asphalt and ethylenevinylacetate resins (and mixtures thereof). Solvents useful in the present invention have a solubility parameter ranging from about 7 to 10, an initial boiling point ranging from about 150°F. to about 325°F. and an evaporation rate ranging from about 0.1 to about 6.0, at room temperature, using butyl acetate as 1.0 as the basis. In other words, the rate of evaporation of the organic solvents of this invention should be between one-tenth and six times that of butyl acetate at room temperature. It is, however, to be noted that blends of solvents (e.g. binary or ternary) of different evaporation rates are particularly desirable in the present invention. These organic solvent blends can provide the physical volume of liquid necessary to wet the pre-coated aggregate granules while controlling and minimizing the time to full set of the repair by varying the amount of low evaporation rate solvent in the mixture. As an example, a 66.7/33.3 blend by weight percent of 1,1,1-trichloroethane (evaporation rate of 6.0) and toluene (evaporation rate of 2.0) or a 66.7/17.8/15.5 blend by weight percent of 1,1,1-trichloroethane, toluene and mineral spirits (evaporation rate of 0.28) will set in a much shorter time than when toluene or mineral spirits per se are used. However, using only solvent having a high evaporation rate (e.g. 1,1,1-trichloroethane) has the disadvantage that the coated aggregate granules will fuse together before the granules can be applied to the pavement. This can also be an advantage depending upon how rapidly one can apply the pre-coated granules to the pavement to be patched and how soon one wants the patched pavement to be capable of having vehicular traffic.

If blends of solvents are utilized, it is, in general, desirable to have at least 50 percent, by weight, of a solvent having an evaporation rate of between 3 or 4 and 6 with the remainder of the solvents in the blend having an evaporation rate of less than 3.0 (e.g. between 0.1 and 2.0).

Organic solvents which have been found to be useful in the present invention and which have the foregoing properties (i.e. the correct boiling point, the correct evaporation rate, and the correct solubility parameter) include a variety of hydrocarbons such as halogenated hydrocarbons, oxygenated hydrocarbons, olefinic hydrocarbons, paraffinic hydrocarbons, napthenic hydrocarbons, aromatic hydrocarbons, etc. Exemplary of organic solvents falling within the foregoing classes are methyl ethyl ketone, tetrahydrofuran, light petroleum distillates such as mineral spirits (it should be noted that this definition excludes such distillates as kerosene and the like because they do not possess the enumerated properties required by the organic solvents of the present invention), benzene, toluene, xylene, and trichloroethane.

In addition to the foregoing requirements, the compositions of the present invention (after the solvent has been added and allowed to evaporate) have excellent properties and, most importantly, these properties can vary depending upon the particular asphalt pavement being repaired. In this regard, it is pointed out that it is advantageous for the repair material if it has a lower stability but higher flow value than the surrounding pavement for the repair can then more easily accommodate the local stresses that caused the failure in the pavement initially. Using a very rigid material to repair asphalt pavement results in the pavement disintegrating around the perimeter of the repair until the repair finally breaks completely in one or two large sections. On the other hand, using a very pliable material (i.e. one with a high flow rate value) will result in the dishing and subsequent destruction of the repair itself. In general, such flow rates and stability values are indicated by the Marshall test (ASTM-D-1559).

In order to more fully exemplify the present invention the following preferred exemplary embodiments will be given.

EXAMPLE I

Four parts by weight of asphalt having a penetration value of 40-50 was heated to 300°F and 1 part by weight of ethylenevinylacetate copolymer (having an 18% vinylacetate content) was slowly added while stirring until a uniform admixture was obtained. Thereafter, 95 parts by weight of aggregate was added with tumbling until the aggregate was coated with the binder (i.e. the admixture of asphalt and ethylene-vinylacetate copolymer) and then poured onto a flat belt and when cool was packaged in suitable containers.

Thereafter 100 parts by weight of the aggregate coated with binder was mixed with 2 parts by weight of a solvent solution containing 1.8 parts by weight of solvent (a mixture of 66.7 weight percent of 1,1,1-trichloroethane and 33.3 weight percent of toluene), 0.16 parts by weight of an asphalt having a 40-50 penetration reading and 0.04 parts by weight of an ethylene-vinylacetate copolymer having an 18% vinylacetate content. The resulting composition had a Marshall stability (pounds) of 666 and a Marshall flow (1/100 inches) of 13.

The composition was applied as patches (without application of heat) to asphalt roadbed during the winter months in extensive northern areas of the United States, including Alaska, and it was found that it could be easily compacted and, to date has performed well.

EXAMPLE II

Four parts by weight of asphalt having a penetration value of 85-100 was heated to around 300°F and 1 part by weight of ethylene-vinylacetate resin having a 33% vinylacetate content was added thereto and the resulting mixture stirred until uniform. Thereafter, 95 parts by weight of aggregate was added and the resulting composition tumbled until the individual granules and particles of aggregate were uniformly coated with the binder of asphalt and ethylene-vinylacetate copolymer. After the material cooled there was added 2 parts by weight of a solvent solution containing 1.6 parts by weight of the solvent of Example I, 0.32 parts by weight of asphalt having a 40-50 penetration value and 0.08 parts by weight of ethylene-vinylacetate copolymer having a 42% vinylacetate content. The resulting composition has a Marshall stability, in pounds, of 454 and a Marshall flow (1/100 inches) of 13 . This material was also tested by filling voids in asphalt pavements without application of heat and worked satisfactorily.

It is to be understood that the foregoing preferred exemplary embodiments are for the purpose of illustration only and that certain variations thereof can be utilized and still come within the spirit and scope of this invention as defined in the appended claims. For example, other solvents, asphalts, ethylene-vinylacetate copolymers and different proportions can be utilized and still be within the spirit and scope of this invention.

I claim:

1. Method for repairing asphalt pavement having voids on the top surface thereof which comprises:
    forming a uniform admixture of (a) aggregate granules the surfaces of which are substantially completely coated with a coating composition consisting essentially of a mixture of asphalt and ethylene-vinylacetate copolymer and (b) between 0.5 to 5 percent, by weight, of a solvent solution consisting essentially of an organic solvent for the coating composition which will tackify and solvate said coating composition said organic solvent having a solubility parameter from about 7 to 10, a boiling point from about 150°F. to about 325°F. and an evaporation rate of from about 0.1 to 6.0, at room temperature, using butyl acetate as 1.0 as the basis; and from 0 to 50 percent, by weight, of a binder which is a mixture of asphalt and ethylene-vinylacetate copolymer;
    and filling said voids with said admixture and compacting the same in said voids to form a long lasting patch which can be driven upon by vehicular traffic shortly after filling said voids.

2. A method according to claim 1 wherein the amount of asphalt in the coating composition is between 95 and 60 percent, by weight, based on the weight of the coating composition and the amount of ethylene-vinylacetate copolymer is between 5 and 40 percent, by weight, based on the weight of the coating composition.

3. A method according to claim 2 wherein the ethylene-vinylacetate copolymer has a melt index of between 15 and 200 and contains from 18 to 42 percent, by weight, of vinylacetate.

4. A method according to claim 2 wherein the asphalt has a penetration value of 40-50 to 120-150.

5. A method according to claim 1 wherein the coating composition is present in an amount of from 3 to 12 percent, by weight.

6. A method according to claim 1 wherein the solvent solution contains the binder in an amount of from 5 to 50 percent, by weight, based on the entire weight of the solvent solution.

7. A method according to claim 1 wherein the amount of solvent solution is from 0.5 to 4 percent, by weight.

8. A composition for repairing asphalt pavement which comprises a uniform admixture of (a) aggregate granules the surfaces of which are substantially completely coated with a coating composition consisting essentially of a mixture of asphalt and ethylene-vinylacetate copolymer said organic solvent having a solubility parameter from about 7 to 10, a boiling point from about 150°F. to about 325°F. and an evaporation rate of from about 0.1 to 6.0, at room temperature, using butyl acetate as a basis; and (b) less than 5 percent, by weight, of a solvent solution consisting essentially of a solvent for the coating composition which will tackify and solvate said coating composition and from 0 to 50 percent, by weight, of a binder which is a mixture of asphalt and ethylene-vinylacetate copolymer.

9. A composition according to claim 8 wherein the amount of asphalt in the coating composition is between 95 and 60 percent, by weight, based on the weight of the coating composition and the amount of ethylene-vinylacetate copolymer is between 5 and 40 percent, by weight, based on the weight of the coating composition.

10. A composition according to claim 9 wherein the ethylene-vinylacetate copolymer has a melt index of between 15 and 200 and contains from 18 to 42 percent, by weight of vinylacetate.

11. A composition according to claim 9 wherein the asphalt has a penetration value of 40–50 to 120–150.

12. A composition according to claim 8 wherein the coating composition is present in an amount of from 3 to 12 percent, by weight.

13. A composition according to claim 8 wherein the solvent solution contains the binder in an amount of from 5 to 50 percent, by weight, based on the entire weight of the solvent solution.

14. A composition according to claim 8 wherein the amount of solvent solution is from 0.5 to 11 percent, by weight.

15. Method for repairing asphalt pavement having voids on the top surface thereof which comprises:

forming a uniform admixture of (a) aggregate granules the surfaces of which are substantially completely coated with a coating composition consisting essentially of a mixture of asphalt and ethylene-vinylacetate copolymer and (b) between 0.5 to 5 percent, by weight, of a solvent solution consisting essentially of an organic solvent for the coating composition said organic solvent having a solubility parameter from about 7 to 10, a boiling point from about 150°F. to about 325°F. and an evaporation rate of from about 0.1 to 6.0, at room temperature, using butyl acetate as 1.0 as the basis; and from 0 to 50 percent, by weight, of an asphalt binder;

and filling said voids with said admixture and compacting the same in said voids to form a long lasting patch which can be driven upon by vehicular traffic shortly after filling said voids.

16. Method for repairing asphalt pavement having voids on the top surface thereof which comprises:

forming a uniform admixture of (a) aggregate granules the surfaces of which are substantially completely coated with a coating composition consisting essentially of a mixture of asphalt and ethylene-vinylacetate copolymer and (b) between 0.5 to 5 percent, by weight, of a solvent solution consisting essentially of an organic solvent for the coating composition which will tackify and solvate said coating composition said organic solvent having a solubility parameter from about 7 to 10, a boiling point from about 150°F. to about 325°F. and an evaporation rate of from about 0.1 to 6.0, at room temperature, using butyl acetate as 1.0 as the basis; and from 0 to 50 percent, by weight, of an ethylene-vinylacetate copolymer binder;

and filling said voids with said admixture and compacting the same in said voids to form a long lasting patch which can be driven upon by vehicular traffic shortly after filling said voids.

17. A composition for repairing asphalt pavement which comprises a uniform admixture of (a) aggregate granules the surfaces of which are substantially completely coated with a coating composition consisting essentially of a mixture of asphalt and ethylene-vinylacetate copolymer said organic solvent having a solubility parameter from about 7 to 10, a boiling point from about 150°F. to about 325°F. and an evaporation rate of from about 0.1 to 6.0, at room temperature, using butyl acetate as a basis; and (b) less than 5 percent, by weight, oif a solvent solution consisting essentially of a solvent for the coating composition which will tackify and solvate said coating composition and from 0 to 50 percent, by weight, of an asphalt binder.

18. A composition for repairing asphalt pavement which comprises a uniform admixture of (a) aggregate granules the surfaces of which are substantially completely coated with a coating composition consisting essentially of a mixture of asphalt and ethylene-vinylacetate copolymer said organic solvent having a solubility parameter from about 7 to 10, a boiling point from about 150°F. to about 325°F. and an evaporation rate of from about 0.1 to 6.0, at room temperature, using butyl acetate as a basis; and (b) less than 5 percent, by weight, of a solvent solution consisting essentially of a solvent for the coating composition which will tackify and solvate said coating composition and from 0 to 50 percent, by weight, of an ethylenevinylacetate copolymer binder.

* * * * *